United States Patent [19]

Ross

[11] 4,399,489

[45] Aug. 16, 1983

[54] HIGH TEMPERATURE ELECTROLYTIC CAPACITOR

[75] Inventor: Sidney D. Ross, Williamstown, Mass.

[73] Assignee: Sprague Electric Company, North Adams, Mass.

[21] Appl. No.: 361,994

[22] Filed: Mar. 25, 1982

[51] Int. Cl.³ .............................................. H01G 9/00
[52] U.S. Cl. .................................... 361/433; 252/62.2
[58] Field of Search ........................ 252/62.2; 361/433

[56] References Cited

U.S. PATENT DOCUMENTS

| | | | |
|---|---|---|---|
| 3,182,236 | 4/1965 | Stockel | 317/230 |
| 3,302,071 | 1/1967 | Stahr | 252/62.2 |
| 3,403,305 | 9/1968 | Santway et al. | 317/230 |
| 3,546,119 | 12/1970 | Chesnot | 252/62.2 |
| 3,585,459 | 6/1971 | Hills et al. | 317/230 |
| 3,646,403 | 2/1972 | Dunkl | 252/62.2 |
| 3,676,752 | 7/1972 | Burger et al. | 317/230 |
| 3,909,682 | 9/1975 | Dunkl et al. | 317/230 |

*Primary Examiner*—John F. Niebling

[57] ABSTRACT

An aluminum electrolytic capacitor for high temperature operation contains a wound aluminum foil capacitor section in contact with an electrolyte capable of operating as high as 150° C., the electrolyte comprising a mixed solvent system of N-methylpyrrolidinone and up to 5 wt % ethylene glycol and a mixed solute system of dimethylammonium or diisopropylammonium borodi-catecholate and diisopropylammonium pentaborate.

4 Claims, 2 Drawing Figures

HIGH TEMPERATURE ELECTROLYTIC CAPACITOR

BACKGROUND OF THE INVENTION

This invention relates to an aluminum electrolytic capacitor which utilizes an electrolyte comprising a mixed solvent system of N-methylpyrrolidinone and up to 5 wt% ethylene glycol plus a mixed solute system of dimethylammonium or diisopropylammonium boro-di-catecholate and diisopropylammonium pentaborate to provide a capacitor capable of operation at 150° C. The solute system may be prepared as two separate solutes or prepared partially or completely in-situ from its components.

In the past, electrolytes that are based predominately on ethylene glycol have proved extremely useful at temperatures up to about 100° C., generally 85° C. For temperatures above 85° C., the solvent choice has been dimethylformamide (DMF) usually, and capacitors containing DMF electrolytes have been valuable for operation up to 125° C.

However, DMF is an agressive solvent, and containing DMF electrolytes in capacitors at operating temperatures above 125° C. has been a distinct problem. A second problem has been the hydrolysis of DMF at 125° C. and above.

Thermal stability of solutes at 125° C. and higher has posed yet another problem. Not only must the solutes not decompose at these temperatures, they must also not react with other electrolyte components or with other capacitor materials. In particular, they must not participate in unfavorable reactions with the barrier layer dielectric oxide at the elevated temperatures.

The demand for capacitors capable of operating at 125° to 150° C. or higher has presented problems to capacitor manufacturers involving electrolyte stability, reactivity, and containment, as well as capacitor materials selection. The solution to these problems involves choices in electrolyte composition and capacitor materials selection.

SUMMARY OF THE INVENTION

This invention features an electrolytic capacitor that is capable of operating at 150° C. through the use of an electrolyte system based on an N-methylpyrrolidinone and ethylene glycol solvent mixture containing as solute dimethylammonium or diisopropylammonium boro-di-catecholate and diisopropylammonium pentaborate.

The N-methylpyrrolidinone is present as the major solvent constituent. This amide was chosen as it is more resistant to hydrolysis than DMF at 125°–150° C., is commercially available, and can be contained by available capacitor sealing materials at these elevated temperatures.

The ethylene glycol is present in a much smaller amount, i.e., at most 5 wt%, and acts to wet the spacer materials to improve electrical porosity. When N-methylpyrrolidinone is the sole solvent, the resulting electrolyte has a high resistivity as this solvent does not wet the spacer material sufficiently. Addition of a relatively small amount of glycol corrects this problem. However, it is important to limit the amount of glycol, as large amounts of it will change the nature of the solute species.

A mixed solute is needed to provide high voltage capability. The pentaborate, either preformed or formed in-situ, together with the boro-di-catecholate provides this. The use of either solute by itself results in a low voltage electrolyte, while the addition of a small amount of the boro-di-catecholate to the pentaborate gives the high voltage capability.

While N-methylpyrrolidinone, a lactam, is similar to DMF, an amide, in many respects, and DMF-based electrolytes have not proven satisfactory at 150° C., it was surprising the present electrolyte was so satisfactory at this temperature. There are also indications that the present electrolyte would be satisfactory even at higher temperatures.

DESCRIPTION OF THE PREFERRED EMBODIMENTS

Figure 1:
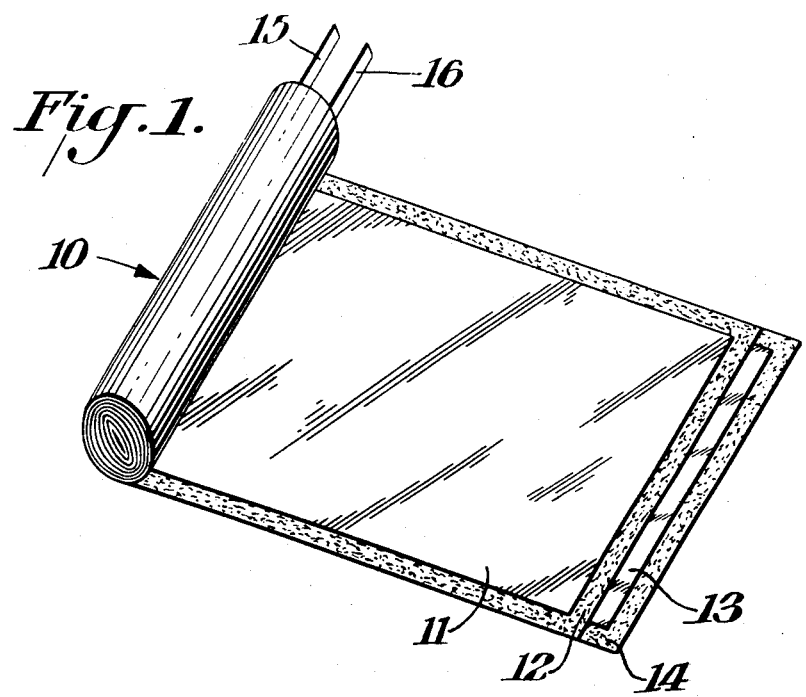
FIG. 1 is a view of a wound capacitor section partially unrolled.

Referring to FIG. 1, wound capacitor section 10 consists of anode foil 11 of aluminum having on its surface an insulating oxide barrier layer. Cathode foil 13 is also aluminum. Electrolyte absorbent layers 12 and 14, preferably paper, are positioned between the anode foil 11 and cathode foil 13 and interwound therewith. Tabs 15 and 16 are connected to electrodes 11 and 13, respectively, to provide for connection of the electrodes to leads. When completely wound, section 10 is impregnated with an electrolyte (not shown) of this invention.

Figure 2:
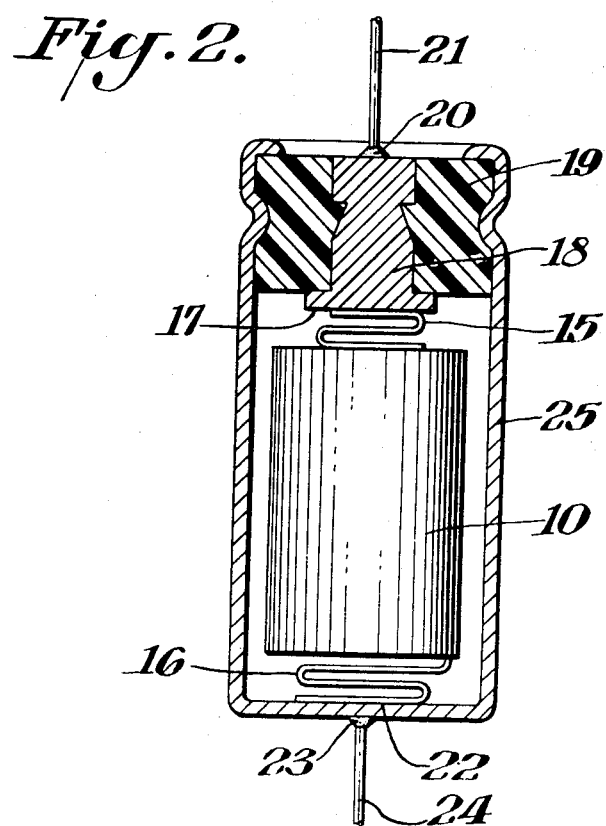
FIG. 2 is a cross-section of a capacitor containing the wound section.

FIG. 2 shows a cross-section of an axial capacitor in which the cathode tab 16 of capacitor section 10 is welded at 23 to cathode lead 24. Anode tab 15 is welded to portion 17 of insert 18 positioned in cover 19 and welded at 20 to anode lead 21. Electrolyte (not shown) impregnates section 10.

The electrolyte system is a mixture of N-methylpyrrolidinone and up to 5 wt% ethylene glycol as solvent with a mixture of diisopropylammonium pentaborate and dimethylammonium or diisopropylammonium boro-di-catecholate as solute. The solute salts may be independently prepared or one or both may be formed in-situ from the appropriate components in the proper mole ratio. Thus a 5:1 ratio of boric acid and diisopropylamine may be added to the solvent mixture and the boro-di-catecholate salt added thereto, or, particularly in the case of the diisopropylammonium boro-di-catecholate, the proper amounts of diisopropylamine, boric acid, and pyrocatechol are added to the solvent mixture and reacted to produce the two salts in-situ.

When the electrolyte is produced in-situ, water is formed as a reaction product. When the two solutes are preformed and added to the solvent mixture with the amount of water calculated to be formed in the in-situ reaction, the resulting electrolyte has the same resistivity and supports anodization to the same voltage as the electrolyte prepared in-situ. Thus, one obtains the same electrolyte from either mode of preparation.

The diisopropylammonium boro-di-catecholate was prepared by dissolving 0.50 mole of catechol in 100 ml of methanol and adding 0.25 mole of boric acid dissolved in hot water. Then 0.25 mole diisopropylamine was added. At this point, all materials were in solution. Crystallization started on cooling, and 250 ml of ether was added. The product in 100% yield was obtained in two crops and melted at 208°–210° C. Samples recrystallized for analysis from acetone-ether or methanol-ether melted at 211°–213° C. Analysis calculated for $C_{18}H_{24}BNO_4$: N=4.25%; found, N=4.13%.

The diisopropylammonium pentaborate was prepared by adding 2.5 moles of boric acid and 0.5 mole of diisopropylamine to 750 ml of N,N'-dimethylformamide. The mixture was heated, and water was added in portions until all was in solution. The solution was taken to dryness with a waterpump, and the crude product was crystallized from methanol-ether in a 69.5% yield. Analysis calculated for $C_6H_2B_5NO_{10}$: N=4.37%; found N=4.35%.

Since water is present, particularly in an electrolyte prepared in-situ, it is postulated that susceptibility to hydrolysis, particularly at 125° C. and higher, may be responsible for the difference in the results reported below. Since N-methylpyrrolidinone is a lactam or cyclic amide with the carbonyl group in the ring, it is not as susceptible to hydrolysis as DMF where the carbonyl group is relatively unprotected. If hydrolysis occurs, then a salt is formed and this results in a lower resistivity. This salt may also affect the maximum anodization voltage of the electrolyte. It appears from the data given below that the DMF-based electrolyte is hydrolyzing to some little extent at the 130° to 150° C. test temperatures.

Amide solvents, other than DMF, may be used instead of N-methylpyrrolidinone providing the boiling point is significantly above 150° C., the vapor pressure is relatively low, and the resistance to hydrolysis at 150° C. is satisfactory. Such an amide is 1-formylpiperidine, also available commercially.

EXAMPLE 1

Two electrolyte formulations were tested in capacitors rated at 22 μF/200 V DC at 130° C., 140° C., and 150° C. for a total of 2000 hours. Electrolyte A is an example of an electrolyte of the present invention and contained 86.6 wt% N-methylpyrrolidinone, 5.0 wt% ethylene glycol, 0.4 wt% dimethylammonium boro-di-catecholate, 2.9 wt% diisopropylamine, and 6.0 wt% boric acid. It had a 25° C. resistivity of 1178 ohm-cm and supports anodization of electropolished foil to 437 V at 125° C. at an average rate of 28.4 V/min and of boiled, electropolished foil to 445 V at 38 V/min. Electrolyte B was the same except that DMF was used in place of N-methylpyrrolidinone. Its 25° C. resistivity was 445.9 ohm-cm and it supported anodization to 487.5 V at 27.1 V/min. The parameters measured were capacitance in μF, % dissipation factor (% DF) and DC leakage (DCL) in μA at each temperature. Failures are given as ratio of the number of failures to the total number of units tested.

TABLE 1

| Temperature | | 130° C. | | 140° C. | | 150° C. | |
|---|---|---|---|---|---|---|---|
| Electrolyte | | A | B | A | B | A | B |
| μF, hrs. | 0 | 23.7 | 27.1 | 23.5 | 26.7 | 23.5 | 26.7 |
| | 168 | 22.0 | 25.4 | 22.3 | 25.5 | 22.5 | 31.0 |
| | 250 | 21.5 | 25.4 | 22.0 | 25.3 | 22.5 | 25.0 |
| | 500 | 21.9 | 25.5 | 22.0 | 25.0 | 22.9 | 25.0 |
| | 1000 | 22.0 | 25.4 | 21.9 | 24.9 | 23.4 | 24.5 |
| | 2000 | 22.4 | 25.0 | 23.3 | 25.2 | 23.4 | 24.5 |
| % DF, hrs. | 0 | 7.6 | 2.4 | 7.7 | 2.4 | 7.5 | 2.4 |
| | 168 | 6.3 | 2.2 | 5.7 | 2.3 | 5.0 | 4.8 |
| | 250 | 6.1 | 2.2 | 5.4 | 2.3 | 4.7 | 2.3 |
| | 500 | 5.3 | 2.1 | 5.4 | 2.3 | 4.7 | 2.2 |
| | 1000 | 5.0 | 2.2 | 4.9 | 2.1 | 6.5 | 2.3 |
| | 2000 | 4.8 | 3.2 | 5.5 | 3.0 | 8.0 | 2.5 |
| μA, hrs. | 0 | 1.7 | 2.5 | 1.7 | 2.5 | 2.0 | 2.2 |

TABLE 1-continued

| Temperature | | 130° C. | | 140° C. | | 150° C. | |
|---|---|---|---|---|---|---|---|
| Electrolyte | | A | B | A | B | A | B |
| | 168 | 1.0 | 3.5 | 0.8 | 1.8 | 19.0 | 10.0 |
| | 250 | 1.3 | 3.0 | 6.0 | 2.0 | 1.8 | 8.0 |
| | 500 | 1.3 | 1.0 | 0.6 | 2.5 | 2.5 | 1.8 |
| | 1000 | 2.0 | 1.5 | 2.0 | 3.0 | 25.0 | 4.5 |
| | 2000 | 0.5 | 2.0 | 1.0 | 3.0 | 40.0 | 50.0 |
| Failures, hrs. | 0 | 0/13 | 0/13 | 0/15 | 0/14 | 0/15 | 0/10 |
| | 168 | 0/13 | 0/13 | 0/15 | 3/14 | 0/15 | 3/10 |
| | 250 | 0/13 | 3/10 | 0/15 | 12/14 | 0/15 | 10/10 |
| | 500 | 0/13 | 8/10 | 0/15 | 12/14 | 0/15 | 10/10 |
| | 1000 | 0/9 | 8/10 | 1/15 | 12/14 | 0/15 | 10/10 |
| | 2000 | 1/8 | 7/7 | 1/15 | 12/14 | 0/15 | 10/10 |

The DF values are higher for electrolyte A because of its higher initial resistivity which also accounts for the lower leakage current. Its excellent failure rate more than offsets the higher DF which can be tolerated while electrolyte leakage cannot be tolerated.

EXAMPLE 2

Electrolyte A of Example 1 was used in capacitor rated at 40–50 μF/200 V DC utilizing three different anode foils and different spacer thicknesses, a single sheet 0.0016 inch thick (A), two sheets each 0.0016 inch thick (B), and a single sheet 0.003 inch thick (C). The capacitors were life-tested for 5500 hours at 130° C. There were 15 capacitors in each group. Average capacitance in μF, average ESR in ohms, median DC leakage in μA, and total number of failures are shown in the table below.

TABLE 2

| | Anode foil | | | | | | | | |
|---|---|---|---|---|---|---|---|---|---|
| | 1 | | | 2 | | | 3 | | |
| Spacer | A | B | C | A | B | C | A | B | C |
| μF | | | | | | | | | |
| 0 hrs. | 32.44 | 32.61 | 31.38 | 37.42 | 35.90 | 36.39 | 29.76 | 28.90 | 28.71 |
| 5500 hrs. | 31.85 | 31.26 | 29.86 | 38.28 | 35.84 | 36.17 | 29.43 | 28.36 | 26.96 |
| ESR, Ω | | | | | | | | | |
| 0 hrs. | 2.96 | 3.55 | 3.08 | 3.42 | 3.86 | 3.45 | 2.42 | 3.07 | 3.48 |
| 5500 hrs. | 1.72 | 2.05 | 2.13 | 1.95 | 2.42 | 2.19 | 1.50 | 1.86 | 2.31 |
| DCL, μA | | | | | | | | | |
| 0 hrs. | 2.8 | 2.9 | 2.5 | 5.9 | 6.8 | 4.5 | 3.1 | 2.2 | 2.3 |
| 5500 hrs. | 8.0 | 8.7 | 0.5 | 13.8 | 5.7 | 0.8 | 10.1 | 4.0 | 0.5 |
| Failures | 1/15 | 0/15 | 0/15 | 1/15 | 1/15 | 0/15 | 0/15 | 0/15 | 0/15 |

Again, the capacitors performed well at the elevated temperature.

EXAMPLE 9

Electrolyte A, as noted above, has a resistivity of 1178 ohm-cm at 24° C. At 125° C., it supports anodization of electropolished foil to 437 V at an average rate of 28.4 V/min and of boiled electropolished foil to 445 V at 38 V/min.

When the dimethylammonium boro-di-catecholate is replaced by 0.6 wt% diisopropylammonium boro-di-catecholate, the resulting electrolyte has a resistivity of 1151 ohm-cm at 25° C. and supports anodization of electropolished foil at 25° C. to 485 V at 27.2 V/min. This electrolyte is made from 86.6 wt% N-methylpyrrolidinone, 4.9 wt% ethylene glycol, 5.9 wt% boric acid, 2.0 wt% diisopropylamine, and 0.6 wt% diisopropylammonium boro-di-catecholate.

Alternately, when the N-methylpyrrolidinone is replaced by 86.6 wt% 1-formylpiperidine with the remaining constituents the same as electrolyte A, the resulting electrolyte has a resistivity of 3610 ohm-cm at 26° C. and supports anodization at 125° C. of boiled electropolished foil to 490 V at 40 V/min.

So far, the examples have been devoted to electrolyte formulations for 200 V or higher capacitors operating at 130°–150° C. By varying electrolyte composition, formulations suitable for low voltage units can be made. One way of doing this is to decrease the amount of pentaborate and increase the amount of boro-di-catecholate.

What is claimed is:

1. An electrolytic capacitor having a wound capacitor section having an etched aluminum foil anode bearing a dielectric oxide barrier layer, an aluminum foil cathode, spacer material interleaved between said anode and said cathode and contiguously wound therewith, and an electrolyte in contact therewith, said electrolyte comprising N-methylpyrrolidinone and up to 5 wt% ethylene glycol as solvent and a solute mixture of diisopropylammonium pentaborate and dimethylammonium or diisopropylammonium boro-di-catecholate, said electrolyte affording capacitor operation at 130° to 150° C.

2. A capacitor according to claim 1 wherein said mixed solute is prepared at least in part in-situ in said solvent system.

3. A capacitor according to claim 2 wherein said electrolyte contains 86.6 wt% N-methylpyrrolidinone, 5.0 wt% ethylene glycol, 2.0 wt% diisopropylamine, 6.0 wt% boric acid, and 0.4 wt% dimethylammonium boro-di-catecholate.

4. A capacitor according to claim 2 wherein said electrolyte contains 86.6 wt% N-methylpyrrolidinone, 4.9 wt% ethylene glycol, 5.9 wt% boric acid, 2.0 wt% diisopropylamine, and 0.6 wt% diisopropylammonium boro-di-catecholate.

* * * * *